United States Patent
Sato

(10) Patent No.: US 9,276,744 B2
(45) Date of Patent: Mar. 1, 2016

(54) IMAGE DATA PROCESSING DEVICE AND IMAGE DATA PROCESSING PROGRAM

(71) Applicant: Oki Data Corporation, Tokyo (JP)

(72) Inventor: Kimitoshi Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 210 days.

(21) Appl. No.: 13/930,569

(22) Filed: Jun. 28, 2013

(65) Prior Publication Data

US 2014/0003601 A1    Jan. 2, 2014

(30) Foreign Application Priority Data

Jun. 29, 2012   (JP) .................................. 2012-147511

(51) Int. Cl.
*H04L 1/00* (2006.01)
*H04L 9/28* (2006.01)
*H04N 1/44* (2006.01)

(52) U.S. Cl.
CPC ................ *H04L 9/28* (2013.01); *H04N 1/4413* (2013.01); *H04N 1/4486* (2013.01)

(58) Field of Classification Search
CPC ....... H04L 9/28; H04N 1/4413; H04N 1/4486
See application file for complete search history.

(56) References Cited

U.S. PATENT DOCUMENTS

| | | | |
|---|---|---|---|
| 2006/0072144 A1* | 4/2006 | Dowling | G06F 21/606 358/1.15 |
| 2006/0187483 A1* | 8/2006 | Baba | H04N 1/00389 358/1.15 |
| 2008/0162941 A1 | 7/2008 | Tomita | |
| 2008/0253573 A1* | 10/2008 | Sakurai | H04N 1/32609 380/278 |
| 2012/0027214 A1* | 2/2012 | Yokota | G06F 21/10 380/286 |
| 2012/0176651 A1* | 7/2012 | Pham | H04N 1/4413 358/3.28 |

FOREIGN PATENT DOCUMENTS

| | | |
|---|---|---|
| EP | 1187390 A1 | 3/2002 |
| JP | 2005-277736 A | 10/2005 |

* cited by examiner

*Primary Examiner* — Nirav B Patel
*Assistant Examiner* — Mohammed Waliullah
(74) *Attorney, Agent, or Firm* — Rabin & Berdo, P.C.

(57) ABSTRACT

A user key storage unit stores at least one user key corresponding to usage authorities of image data. A first encryption unit encrypts the image data using a first encryption key. A second encryption key creation unit creates a second encryption key assigned to each usage authority. A key-storage data creation unit creates a key-storage data for each usage authority by encrypting the first encryption key and authority information using the second encryption key. A user-supplementary data creation unit creates user-supplementary data for each user key. A device-supplementary data creation unit creates device-supplementary data for at least one usage authority and for at least one device key. A data output unit outputs encrypted image data with the key-storage data, the user-supplementary data and the device-supplementary data.

10 Claims, 16 Drawing Sheets

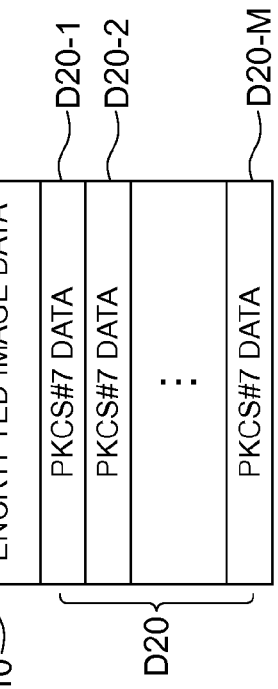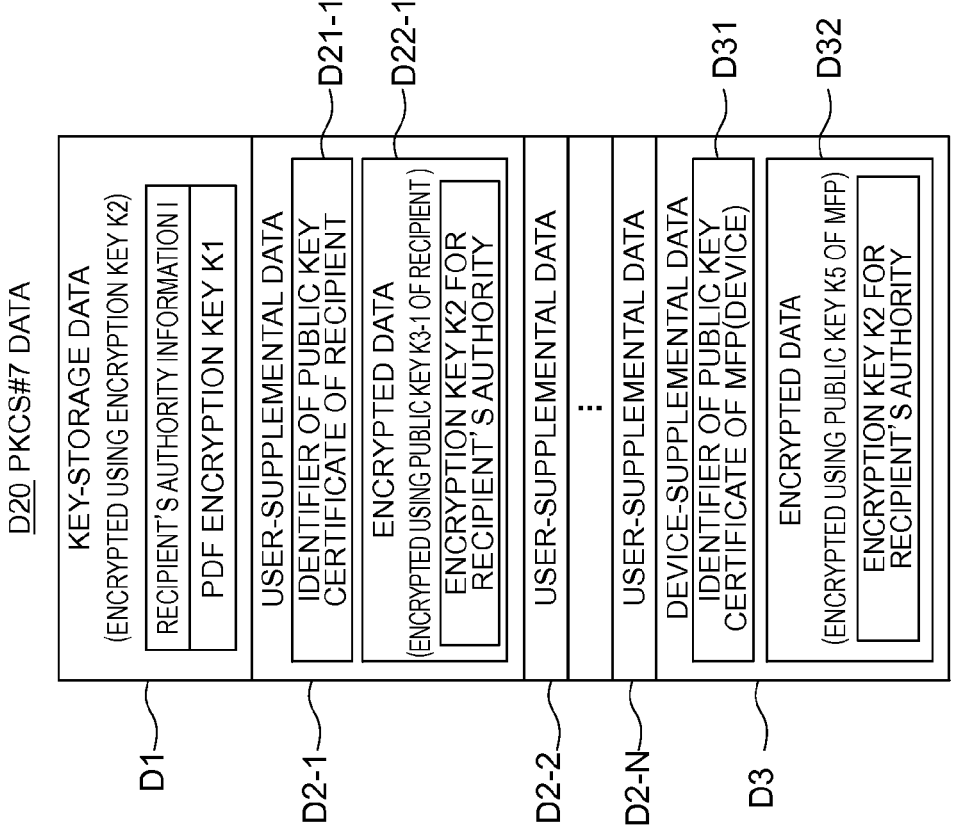

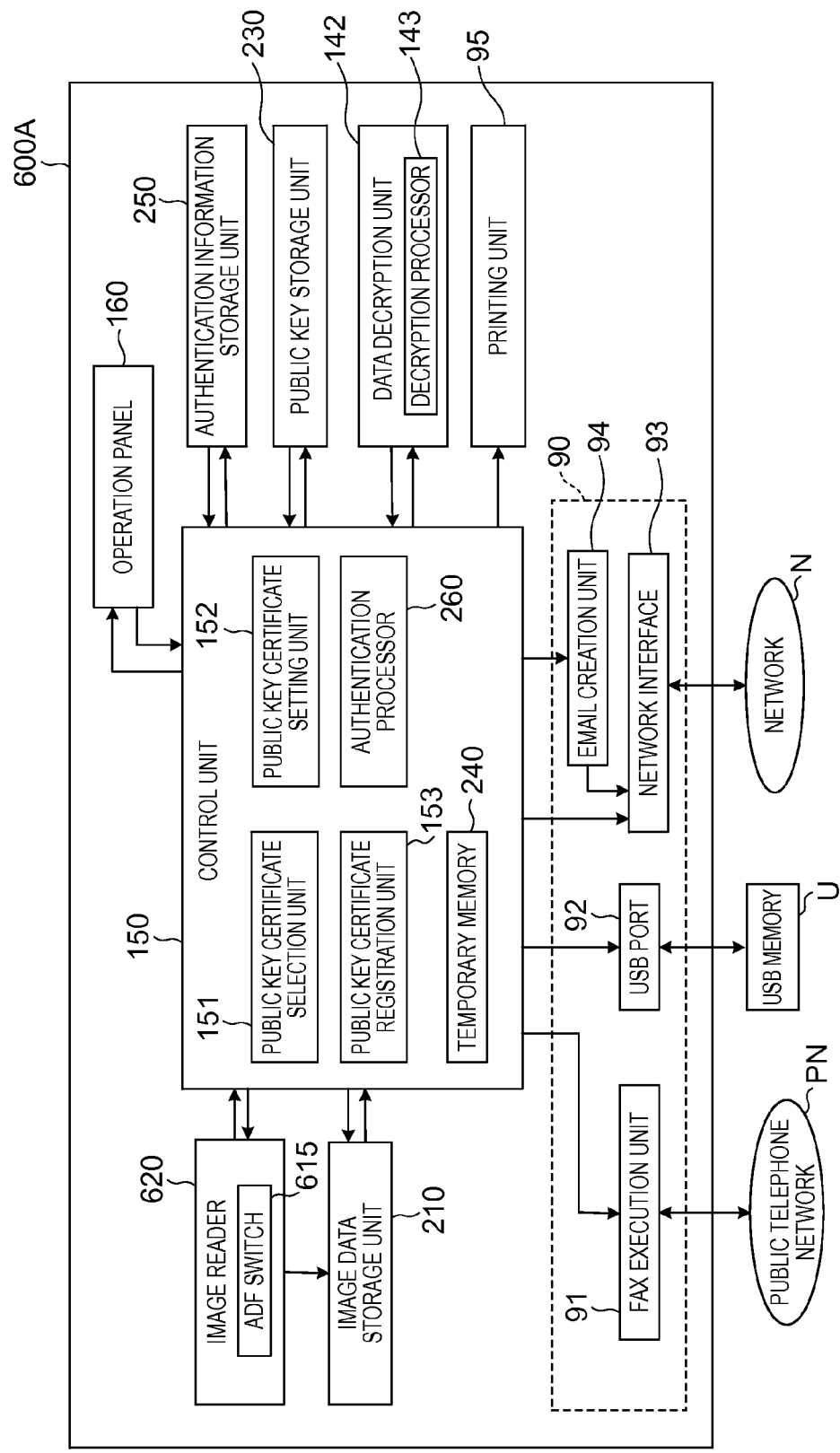

IMAGE DATA PROCESSING DEVICE AND IMAGE DATA PROCESSING PROGRAM

BACKGROUND OF THE INVENTION

The present invention relates to an image data processing device such as an MFP (Multi Function Peripheral) and an image data processing program capable of processing, for example, encrypted PDF (Portable Document Format) files.

A general image data processing device such as an MFP is configured to obtain image data by reading (scanning) a document, and to convert the image data into an encrypted PDF file. Such an encrypted PDF can be attached to an electronic mail, stored in an external storage device connected to the MFP via an USB port, or transferred to a server connected to the MFP via network.

For example, Japanese Laid-open Patent Publication No. 2005-277736 discloses a system that creates an encrypted PDF file by encrypting scanned image data.

In the conventional system, when the MFP (i.e., the image data processing device) creates the encrypted PDF file, the MFP needs to have a public key of a requester (who requests to create the encrypted PDF file).

For example, when the MFP decrypts the PDF file having been encrypted using the public key, the MFP needs to obtain a secret key (corresponding to the public key) from another device via network. Therefore, if a communication error occurs between the MFP and the device having the secret key, security may not be ensured.

Therefore, it is demanded to enhance security in processing encrypted data (for example, an encrypted PDF file).

SUMMARY OF THE INVENTION

An aspect of the present invention is intended to provide an image data processing device and an image data processing program capable of enhancing security in processing encrypted data.

According to an aspect of the present invention, there is provided an image data processing device including an image data storage unit that stores image data, a user key storage unit that stores at least one user key corresponding to respective usage authorities of the image data, a first encryption unit that encrypts the image data stored in the image data storage unit using a first encryption key to create encrypted image data, a second encryption key creation unit that creates a second encryption key assigned to each of the usage authorities of the image data, and a key-storage data creation unit that creates a key-storage data for each of the usage authorities. The key-storage data is created by encrypting the first encryption key and authority information indicating the usage authority using the second encryption key assigned to the usage authority. The image data processing device further includes a user-supplementary data creation unit that creates user-supplementary data for each of the user keys stored in the user key storage unit. The user-supplementary data includes an identifier of the user key and encrypted data created by encrypting the second encryption key assigned to the usage authority corresponding to the user key using the user key. The image data processing device further includes a device-supplementary data creation unit that creates device-supplementary data for at least one of the usage authorities and for at least one device key of at least one image data processing device. The device-supplementary data includes an identifier of the device key and encrypted data created by encrypting the second encryption key assigned to the usage authority using the device key of the image data processing device. The image data processing device further includes a data output unit outputs the encrypted image data with supplementary data including the key-storage data, the user-supplementary data and the device-supplementary data for each of the usage authorities.

With such a configuration, it becomes possible to execute decryption and output of encrypted image data more safely.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the attached drawings:

FIG. 12A is an illustrative view showing an example of a data structure of PKCS#7 data D20 according to the first embodiment;

FIG. 12B is an illustrative view showing an example of a data structure of a completed encrypted PDF file according to the first embodiment;

FIG. 21 is a function block diagram showing another example of the MFP according to the first and second embodiments.

DETAILED DESCRIPTION OF THE PREFERRED EMBODIMENT

Hereinafter, embodiments of the present invention will be described with reference to drawings. The drawings are provided for illustrative purpose and are not intended to limit the scope of the present invention.

First Embodiment

An image data processing device and an image data processing program according to the first embodiment of the present invention will be described with reference to drawings. In the first embodiment, an MFP (Multi Function Peripheral) will be described as an example of the image data processing device.

Configuration of First Embodiment

Figure 1:
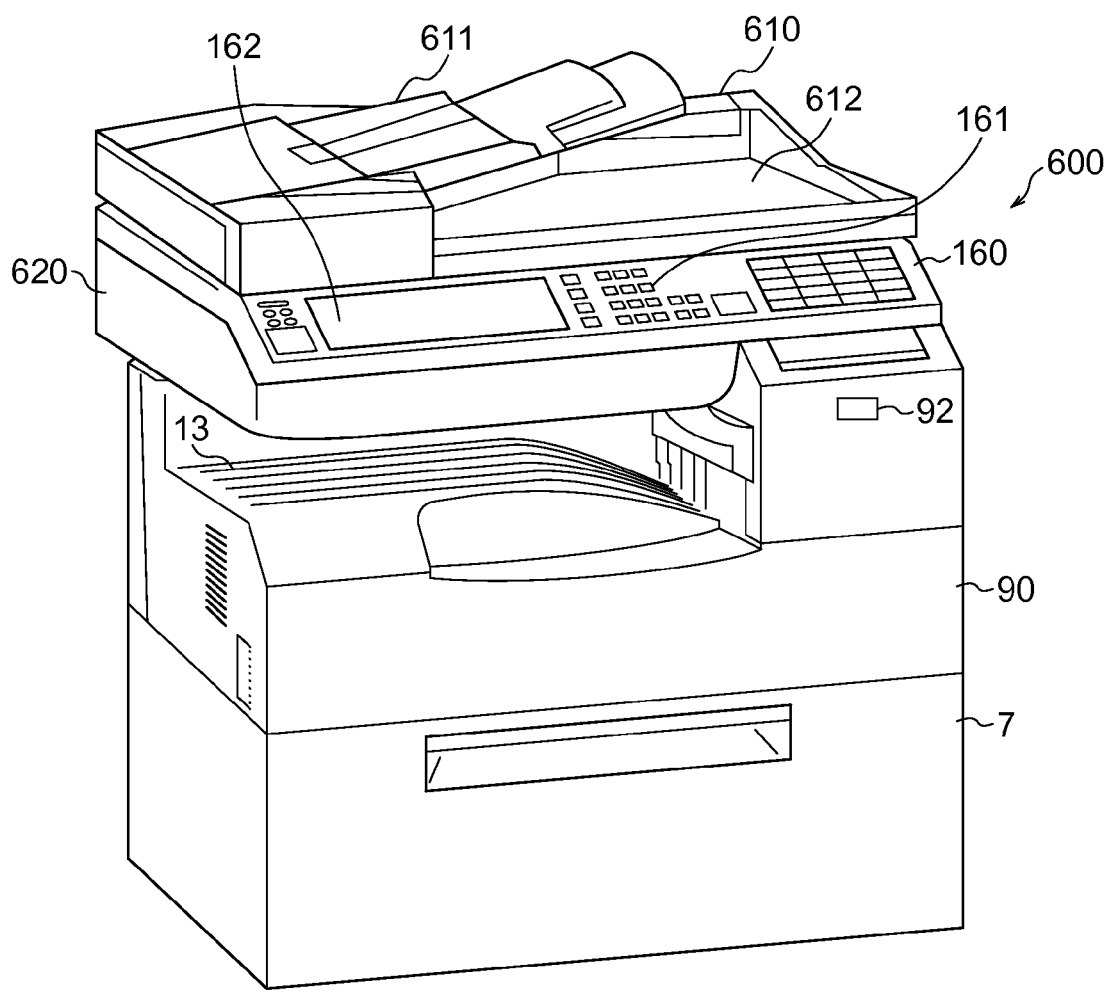
FIG. 1 is a perspective view showing an external configuration of an MFP according to the first embodiment of the present invention.
Figure 2:
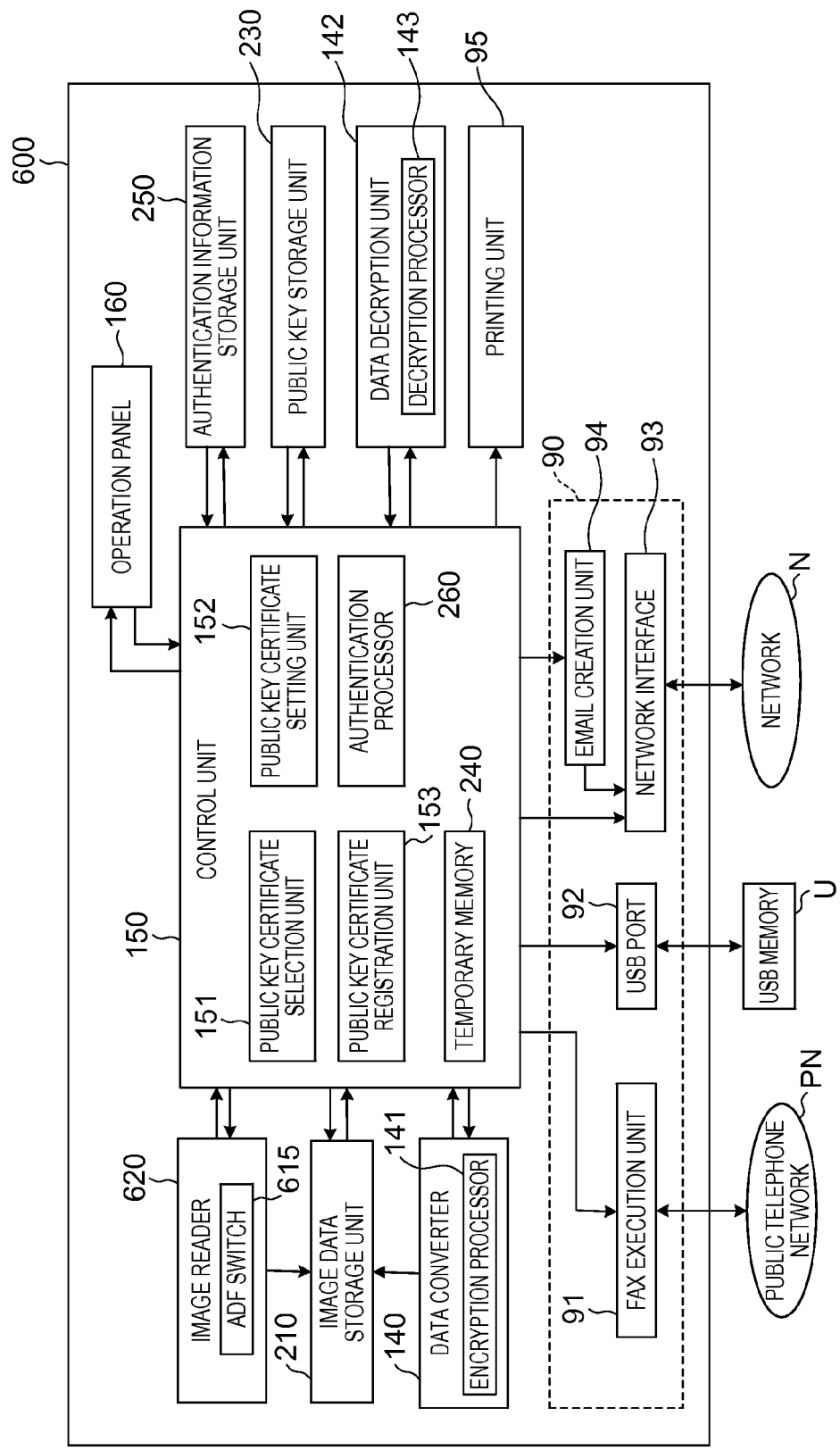
FIG. 2 is a function block diagram showing the MFP according to the first embodiment.

FIG. 1 is a perspective view showing an external configuration of an MFP 600 according to the first embodiment. FIG. 2 is a function block diagram of the MFP 600.

As shown in FIG. 1, the MFP 600 includes an automatic document feeder (hereinafter referred to as an ADF) 610, an image reader 620, an operation panel 160, an accessory function execution unit 90 and a printing medium housing unit 7. The operation panel 160 functions as an intermediary between a user (an operator) and the MFP 600 for exchanging information. The accessory function execution unit 90 includes modules for executing accessory functions such as an email creation function, a network communication function and a file output function.

As shown in FIG. 2, the MFP 600 further includes a printing unit 95. The printing unit 95 is controlled by a control unit 150 described below, and forms (i.e., prints) an image on a printing medium (such as a paper) fed from the printing medium housing unit 7. In this regard, the printing unit 95 functions as an "output unit".

The MFP 600 includes the control unit 150, a data converter 140, a data decryption unit 142, an image data storage unit 210, a public key storage unit 230, and an authentication information storage unit 250. These components (mainly executing data and signal processing) can be constructed by, for example, installing corresponding programs (including an image data processing program according to the first embodiment) into an information processing device having a processor or a memory. Even in such a case, a function block diagram can be illustrated as shown in FIG. 2.

The operation panel 160 has an operation key 161 (FIG. 1) with which the user inputs necessary information (i.e., settings or the like) for operating the MFP 600. The operation panel 160 also has a function to present necessary information to the user by, for example, displaying information on a display 162 (FIG. 1). The MFP 600 causes the operation panel 160 (i.e., a touch panel) to present necessary information to the user. When inputting an instruction into or setting a set value of the MFP 600, the user touches the operation panel 160 or presses the operation key 161 based on an instruction displayed on the operation panel 160.

The ADF 610 includes a document feeding tray 611 (FIG. 1) in which documents (i.e., manuscripts) M are set. An ADF switch 615 is disposed on the medium feeding tray 611, and is configured to detect that the documents M are set in the medium feeding tray 611. When the user inputs an instruction to execute reading (scanning) to the MFP 600, the ADF 610 (FIG. 1) automatically feeds the documents M one by one to a predetermined reading position where the image reader 620 reads each document M.

The image reader 620 includes a light source that emits light toward the document M at the reading position, and a photoelectric conversion element that receives light reflected by the document M. The image reader 620 scans an image of the document M based on a size of the document M. The photoelectric conversion element converts received light into electric signal. After the image reader 620 completes reading the document M, the document M is ejected to a document ejection tray 612 (FIG. 1).

The image reader 620 reads the document M as described above, converts read data (i.e., the electric signal) into scan data (i.e., image data), and stores the scan data in the image data storage unit 210. When the image reader 620 completes reading the document M, the image reader 620 notifies the control unit 150 that the reading is completed.

The image reader 620 further includes the ADF switch 615 disposed on the medium feeding tray 611. When the ADF switch 615 detects that the documents M are set in the medium feeding tray 611, the ADF switch 615 notifies the control unit 150 that setting of the documents M is completed.

Next, the control unit 150 and components related to the control unit 150 will be described.

The control unit 150 includes a public key certificate selection unit 151, a public key certificate setting unit 152, a public key certificate registration unit 153, a temporally memory 240, and an authentication processor (i.e., authentication unit) 260. The control unit 150 entirely controls respective modules of the MFP 600.

The data converter 140 includes an encryption processor 141 configured to execute data conversion (i.e., encryption processing) based on an instruction of the control unit 150. More specifically, the data converter 140 reads image data from the image data storage unit 210 based on the instruction of the control unit 150, causes the encryption processor 141 to convert the image data into an encrypted PDF file using a public key notified by the control unit 150, and supplies the PDF file to the control unit 150.

In this regard, the data converter 140 functions as a "first encryption unit", a "second encryption key creation unit", a "key-storage data creation unit", a "user-supplementary data creation unit", a "device-supplementary data creation unit" and a "data output unit".

A data decryption unit 142 is configured to execute data decryption processing using a decryption processor 143 according to an instruction of the control unit 150. The data decryption unit 142 functions as a "first encryption key acquiring unit", a "second encryption key acquiring unit", and a "decryption unit".

The image data storage unit 210 is configured to store data created by the data converter 140 or the image reader 620.

The public key storage unit 230 is configured to store, for example, public keys and public key certificates in association with user names. Further, the public key storage unit 230 provides the public key and the public key certificate based on an instruction of the control unit 150. In this embodiment, the public key storage unit 230 preliminarily stores the public keys and the public key certificates for respective user names. However, it is also possible that the public key storage unit 230 acquires the public keys and the public key certificates from an external device (for example, a certificate authority)

via a network N as necessary. In this regard, the public key storage unit 230 functions as a "user key storage unit". The public keys for users are also referred to as "user keys".

The authentication information storage unit 250 is configured to store user IDs and passwords in association with each other. The authentication information storage unit 250 provides authentication information (for example, the passwords associated with the user names) based on an instruction of the control unit 150.

The public key certificate selection unit 151 is configured to inquire the user whether or not to execute encryption, and to receive a user's selection (for example, selection of a public key of a recipient) or the like, when converting the image data into the PDF file.

The public key certificate setting unit 152 is configured to acquire the public key certificate from the public key storage unit 230, and stores the acquired public key certificate in the temporary memory 240 according to a user's operation.

The temporary memory 240 is a memory configured to store intermediate processing results of the control unit 150.

The accessory function execution unit 90 includes modules for executing accessory functions. To be more specific, the accessory function execution unit 90 includes a FAX execution unit 91, a USB port 92, a network interface 93 and an email creation unit 94.

The FAX execution unit 91 is configured to establish a connection with a public telephone network PN, and transmit or receive facsimile upon request of the control unit 150.

The USB port 92 is an USB (Universal Serial Bus) interface provided for connection with a USB memory U (i.e., an external storage unit). The USB port 92 executes processing of data (for example, addition of a file) stored in the USB memory U based on an instruction of the control unit 150. In this regard, the USB memory U functions as an "encrypted image data storage unit".

The network interface 93 is an interface for connecting the MFP 600 and the network N. The network interface 93 establishes connection between the MFP 600 with a file server (not shown) on the network N based on an instruction of the control unit 150, and executes processing such as updating of data (file).

The email creation unit 94 creates an email addressed to a destination address as instructed, and sends the email with an attachment file (data) to, for example, an email server on the network N based on an instruction of the control unit 150.

In this regard, the control unit 150 functions as a "user-supplementary data detection unit", an "authority information acquiring unit", an "image output unit" and a "data output unit".

Operation of First Embodiment

An operation of the MFP 600 of the first embodiment having the above described configuration will be described.

Herein, an entire operation of the MFP 600 will be first described with reference to FIG. 3, and thereafter respective steps of the flowchart will be described.

Figure 3:
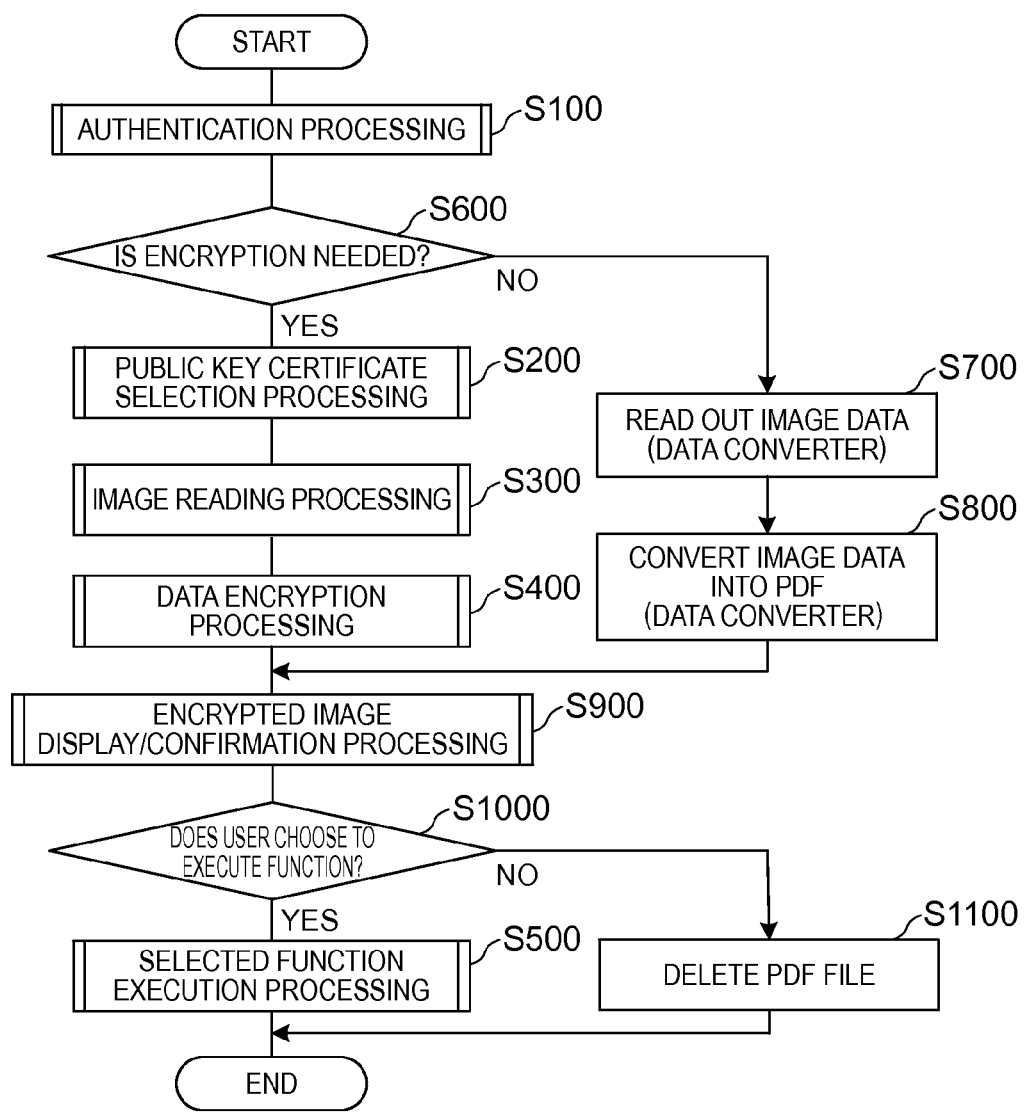
FIG. 3 is a flowchart showing an entire operation of the MFP according to the first embodiment.

FIG. 3 is a flowchart showing the entire operation of the MFP 600 of the first embodiment. First, the authentication processor 260 of the control unit 150 executes an authentication processing (S100) according to a user's operation on the operation panel 160. When the authentication processing is successively completed, the control unit 150 prompts the user to select one of functions to be executed by the MFP 600.

When the user selects function (hereinafter referred to as user-selected function), the control unit 150 decides whether it is necessary to encrypt a PDF file in executing the user-selected function (S600).

When the control unit 150 decides that it is unnecessary to encrypt the PDF file in the user-selected function in the above described step S600, the control unit 150 causes the data converter 140 to read out image data (S700), and to convert the image data (in the form of a plain text) into the PDF file (S800).

In contrast, when the control unit 150 decides that it is necessary to encrypt the PDF file in the user-selected function in the above described step S600, the control unit 150 causes the public key certificate selection unit 151 to execute a public key certificate selection processing (S200). In this step, the public key certificate selection unit 151 stores a public key, a public key certificate and authentication information of a recipient in the temporary memory 240 in such a manner that the public key, the public key certificate and the authentication information are associated with each other. In this regard, a plurality of recipients can be designated in the public key certificate selection processing of the above described step S200.

Next, the control unit 150 causes the image reader 620 to execute an image reading processing (S300). The image reader 620 scans the document M to obtain image data, and stores the image data in the image data storage unit 210.

Then, the control unit 150 causes the data converter 140 to encrypt the image data (S400). The data converter 140 reads the image data from the image data storage unit 210, and creates an encrypted PDF file.

Next, the control unit 150 causes the operation panel 160 to display the encrypted image data so that the user can confirm contents of the encrypted image data (i.e., encrypted image display-and-confirmation processing). The control unit 150 prompts the user to choose whether or not to execute a processing of the image data (S1000).

If the user chooses to execute the processing of the image data in the above described step S1000, the control unit 150 executes the processing of the image data (S500), and ends the processes.

In contrast, if the user does not choose to execute the processing of the image data in the above described step S1000, the control unit 150 deletes the created PDF file (S1100) without executing the processing of the image data, and ends the operation.

Figure 4:
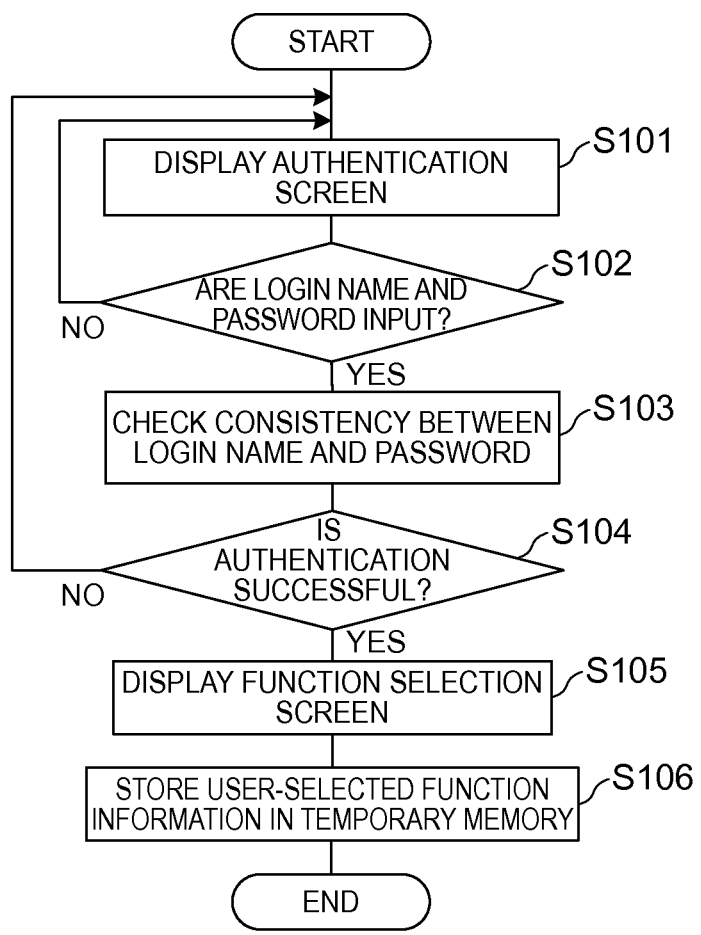
FIG. 4 is a flowchart showing authentication processing according to the first embodiment.

Next, the authentication processing in the above described step S100 (FIG. 3) will be described with reference to FIG. 4. FIG. 4 is a flowchart showing the authentication processing of the first embodiment.

Figure 5:
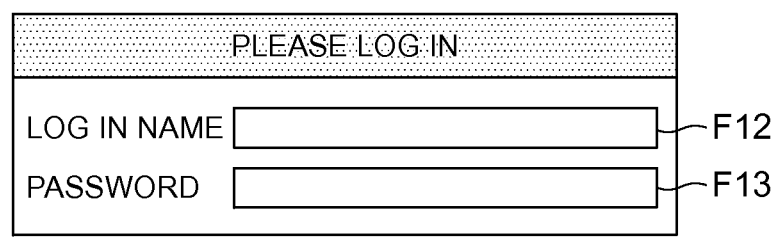
FIG. 5 is an illustrative view showing an example of an authentication screen according to the first embodiment.

When the control unit 150 starts the authentication process, the control unit 150 causes the operation panel 160 to display an operation screen (i.e., an authentication screen) shown in FIG. 5 (S101), and prompts the user to input a login name and a password (S102).

FIG. 5 shows an example of the authentication screen. As shown in FIG. 5, the authentication screen includes a field F12 for inputting the login name, and a field F13 for inputting the password.

Referring back to FIG. 4, when the user inputs the login name and the password in the authentication screen, the authentication processor 260 execute processing to check consistency between the input login name and the input password (S103). To be more specific, the authentication processor 260 searches the authentication information storage unit 250 using the input login name as a search key to detect a password corresponding to the input login name. When the password corresponding to the input login name is detected, the authentication processor 260 compares the detected password and the input password. If both passwords coincide with each other, the authentication processor 260 decides that the authentication is successful. If no password corresponding to the input login name is detected, or if both passwords do not coincide with each other, the authentication processor 260 decides that the authentication is unsuccessful.

Then, the control unit 150 checks whether the authentication by the authentication processor 260 is successful or not (S104). If the authentication is unsuccessful, the control unit 150 returns to the above described steps S101. If the authentication is successful, the control unit 150 causes the operation panel 160 to display a function selection screen as shown in FIG. 6 (S105).

Further, the control unit 150 stores information of the function (i.e., user-selected function information) selected by the function selection screen (FIG. 6) in the temporary memory 240 (S106).

Figure 6:
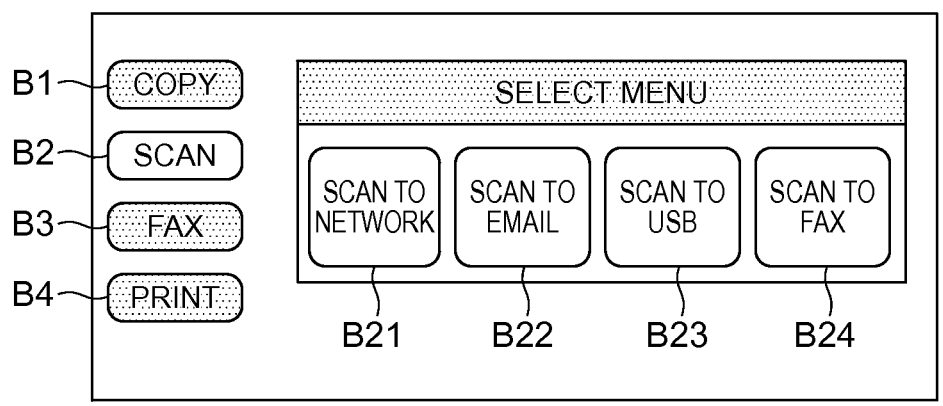
FIG. 6 is an illustrative view showing an example of a function selection screen according to the first embodiment.

FIG. 6 shows an example of the function selection screen. As shown in FIG. 6, the function selection screen includes buttons B1, B2, B3 and B4 displayed on the operation panel 160. The buttons B1, B2, B3 and B4 are located at a left part of the function selection screen. The buttons B1, B2, B3 and B4 are vertically arranged, and respectively correspond to "COPY", "SCAN", "FAX" and "PRINT", i.e., four main functions of the MFP 600. FIG. 6 shows a state where the button B2 (highlighted in FIG. 6) corresponding to a scanning function ("SCAN") is selected. Further, in a state where the button B2 is selected, buttons B21, B22, B23 and B24 are also displayed in the function selection screen. The buttons B21, B22, B23 and B24 respectively correspond to "Scan to Network", "Scan to Email", "Scan to USB", and "Scan to Fax", i.e., four sub-functions. Using the function selection screen, the user selects one of the main functions and one of the sub-functions. The control unit 150 stores information (i.e., information on the main function and the sub-function) indicating the user-selected function in the temporary memory 240.

Figure 7:
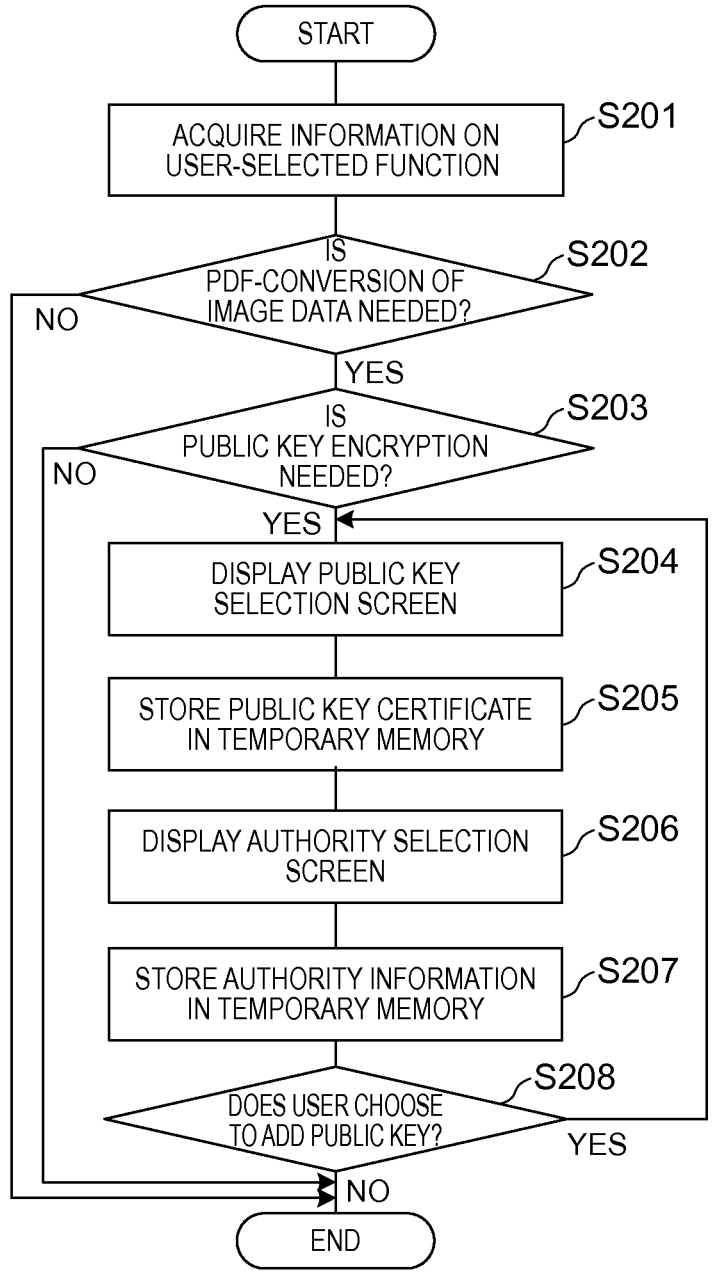
FIG. 7 is a flowchart showing public key certificate selection processing according to the first embodiment.

Next, the public key certificate selection processing in the above described step S200 (FIG. 3) will be described with reference to FIG. 7. FIG. 7 is a flowchart showing the public key certificate selection processing of the first embodiment.

First, the public key certificate selection unit 151 of the control unit 150 acquires the information on the user-selected function from the temporary memory 240 (S201). The public key certificate selection unit 151, then decides whether it is necessary to convert the scanned image data into a PDF file (S202). If the public key certificate selection unit 151 decides that it is necessary to convert the scanned image data into the PDF file, the public key certificate selection unit 151 proceeds to step S203 described below. If the public key certificate selection unit 151 decides that it is unnecessary to convert the scanned image data into the PDF file, the public key certificate selection unit 151 ends the public key certificate selection processing.

For example, when the user-selected function is "Scan to Fax", the public key certificate selection unit 151 decides that it is unnecessary to convert the scanned image data into the PDF file. If the user-selected function is "Scan to USB", the public key certificate selection unit 151 decides that it is necessary to convert the scanned image data into the PDF file.

If the public key certificate selection unit 151 decides that it is necessary to convert the scanned image data into the PDF file in the above described step S202, the public key certificate selection unit 151 prompts the user to choose whether or not to execute a public key encryption processing (S203). For example, the public key certificate selection unit 151 causes the operation panel 160 to display a message "Do you want public key encryption processing to be executed?" and also display two buttons indicating "YES" and "NO" so that the user can choose whether or not to execute the public key encryption processing. If the user does not choose to execute the public key encryption processing, the public key certificate selection unit 151 ends the public key certificate selection processing. If the user chooses to execute the public key encryption processing, the public key certificate selection unit 151 proceeds to steps S204 through S207 to execute the public key encryption processing as described below.

Figure 8:
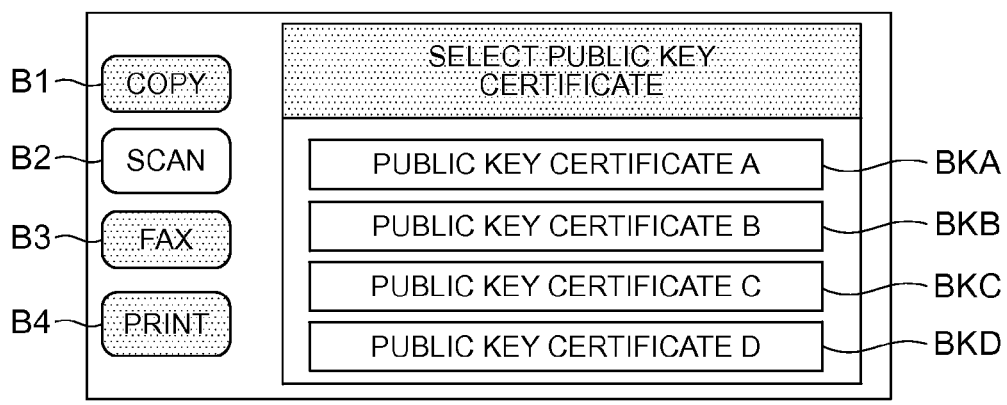
FIG. 8 is an illustrative view showing an example of a public key certificate selection screen according to the first embodiment.

If the user chooses to execute the public key encryption processing in the above described step S203, the public key certificate selection unit 151 causes the operation panel 160 to display a public key certificate selection screen in FIG. 8 (S204). Using the public key certificate selection screen, the public key certificate selection unit 151 prompts the user to select a public key certificate for use in encrypting the PDF file among public key certificates stored in the public key storage unit 230.

FIG. 8 is an illustrative view showing an example of a public key certificate selection screen of the first embodiment. The public key certificate selection screen includes buttons BKA, BKB, BKC and BKD indicating respective identifiers of public key certificates KA, KB, KC and KD. The public key-storage portion 230 stores the public key certificates KA, KB, KC and KD. When the user selects one of the buttons BKA, BKB, BKC and BKD, the public key certificate selection unit 151 specifies the public key certificate and the public key corresponding to the selected button. That is, an owner of the public key certificate selected in the public key certificate selection screen is specified as a recipient of the PDF file.

Then, referring back to FIG. 7, the public key certificate selection unit 151 reads out the selected public key certificate and the public key from the public key certificate storage unit 230, and stores the public key certificate and the public key in the temporary memory 240 (S205).

Figure 9:
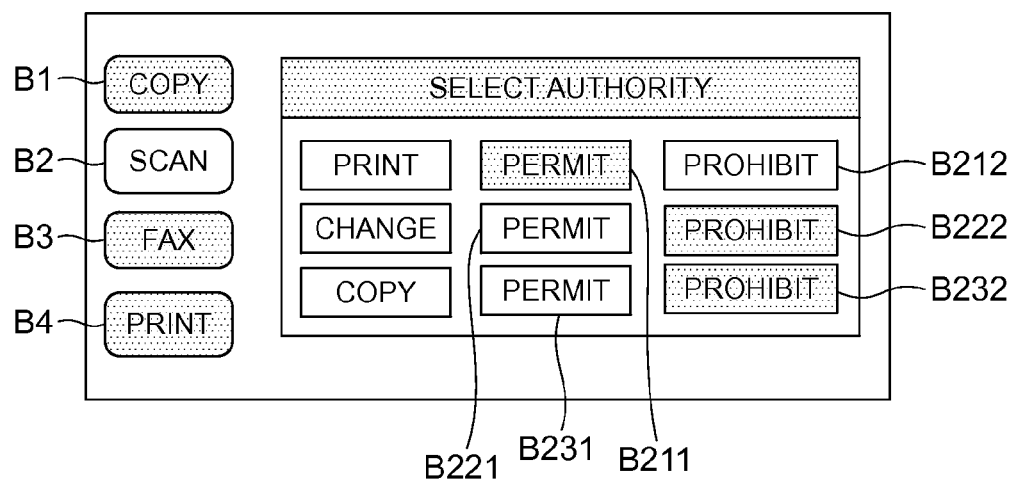
FIG. 9 is an illustrative view showing an example of an authority selection screen according to the first embodiment.

Next, the public key certificate selection unit 151 causes the operation panel 160 to display an authority selection screen shown in FIG. 9, and prompts the user to select a usage authority to use the PDF file (i.e., permission or prohibition of each of printing, changing and copying of the PDF file) corresponding to the stored public key certificate (S206).

FIG. 9 shows an example of the authority selection screen of the first embodiment. The authority selection screen includes buttons B211 and B212 respectively indicating permission and prohibition of "printing" of the PDF file corresponding to the selected public key certificate. The authority selection screen further includes buttons B221 and B222 respectively indicating permission and prohibition of "changing" of said PDF file. The authority selection screen further includes buttons B231 and B232 respectively indicate permission and prohibition of "copying" of said PDF file. The authority selection screen (FIG. 9) enables the user to select a usage authority assigned to the owner of the selected public key certificate (i.e., the recipient of the encrypted PDF file). The public key certificate selection unit 151 holds the selected usage authority as "usage authority information". In this example, the usage authority information set by the MFP 600 includes three items (i.e., printing, changing and copying). However, the number and combination of the usage authority information of the items are not limited.

Then, referring back to FIG. 7, the public key certificate selection unit 151 stores the selected usage authority information in the temporary memory 240 (S207).

Next, the public key certificate selection unit 151 prompts the user to choose whether or not to add a public key certificate for use in encrypting the PDF file (S208). If the user chooses to add the public key certificate, the public key certificate selection unit 151 returns to the above described step S204 to display the public key certificate selection screen. If the user does not choose to add the public key certificate, the public key certificate selection unit 151 ends the public key certificate selection processing.

Figure 10:
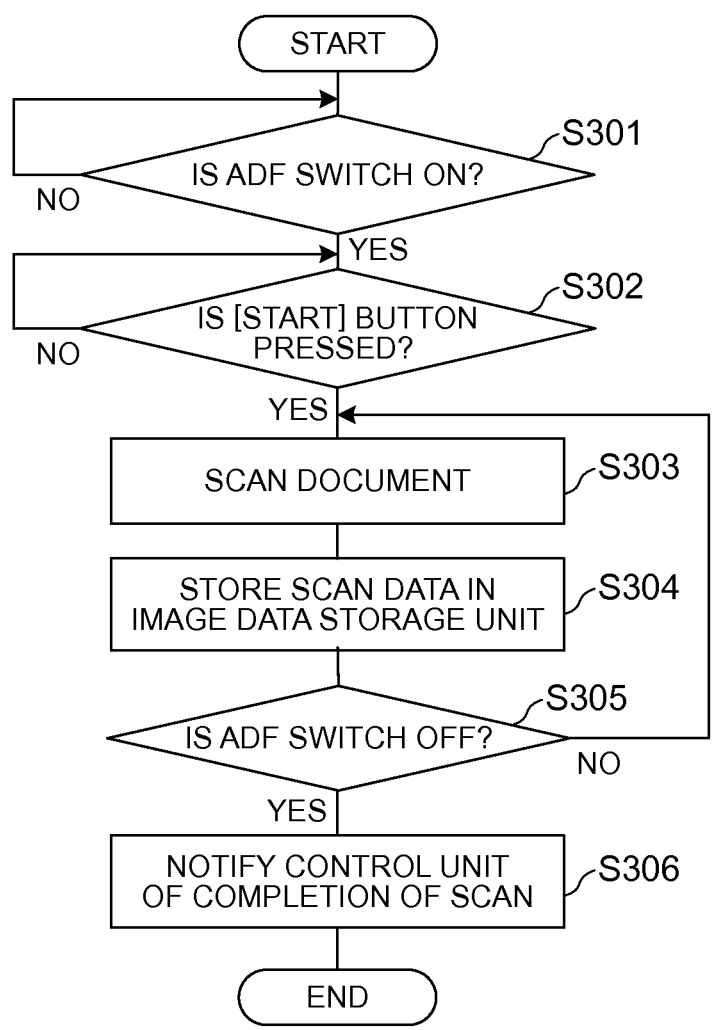
FIG. 10 is a flowchart showing image reading processing according to the first embodiment.

Next, the image reading processing in the above described step S300 (FIG. 3) will be described with reference to FIG. 10. FIG. 10 is a flowchart showing the image reading processing of the first embodiment.

When the user sets the documents M in the document feeding tray 611, the ADF switch 615 detects the setting of the documents M and outputs an ON signal (S301). When the user inputs an instruction to start reading (scanning) the documents M by, for example, pressing a "start" button on the operation panel 160, the operation panel 160 outputs an operation signal. When the control unit 150 receives the ON signal from the ADF switch 615 and the operation signal from the operation panel 160 (S302), the control unit 150 causes the image reader 620 to start scanning the documents M.

The image reader 620 scans each document M fed from the ADF tray 611 (S303), converts read data into image data, and stores the image data in the image data storage unit 210 (S304). When all the documents M are fed out of the ADF tray 611, the ADF switch 615 outputs an OFF signal (S305), and the image reader 620 notifies the control unit 150 that scanning is completed (S306).

Figure 11:
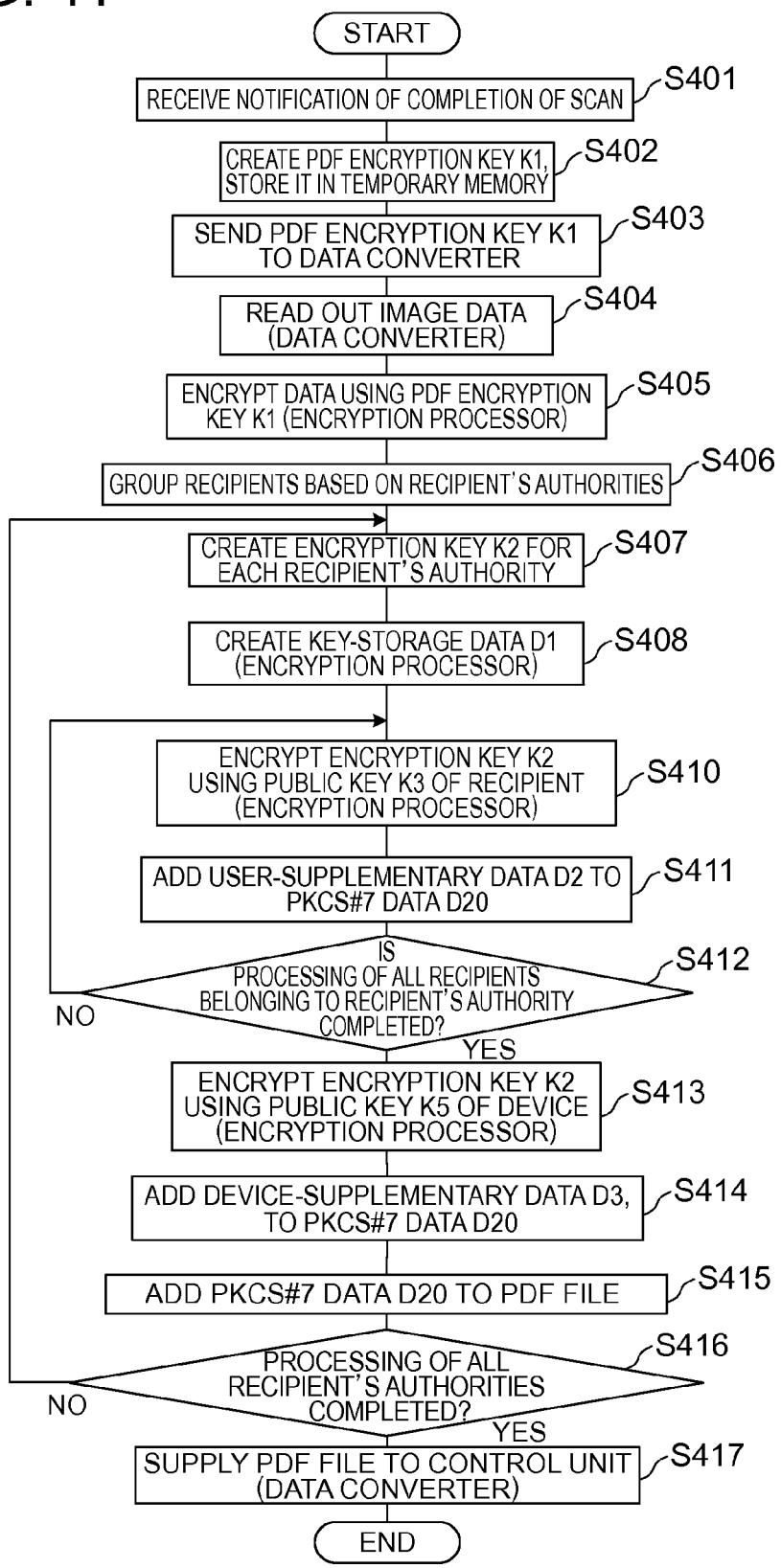
FIG. 11 is a flowchart showing data encryption processing according to the first embodiment.

Next, the data encryption processing in step S400 (FIG. 3) will be described with reference to FIG. 11. FIG. 11 is a flowchart showing the data encryption processing of the first embodiment.

When the image reading processing of step S300 is completed (i.e., when the control unit 150 is notified of the completion of scanning) (S401), the control unit 150 creates a PDF encryption key K1 based on current date and current time, and stores the PDF encryption key K1 in the temporary memory 240 (S402). The PDF encryption key K1 is an encryption key of a common key encryption system, and is also used in decryption. An algorithm for creating the PDF encryption key K1 is not limited, and various algorithms may be used. In this regard, the PDF encryption key K1 is also referred to as a "first encryption key".

Then, the control unit 150 reads the created PDF encryption key K1 from the temporary memory 240, and supplies the PDF encryption key K1 to the data converter 140 (more specifically, the encryption processor 141) (S403).

Next, the data converter 140 (more specifically, the encryption processor 141) reads out the image data that was stored in the image data storage unit 210 in the above described step S300 (S404).

Further, the data converter 140 creates an encrypted PDF file based on the obtained image data using the PDF encryption key K1 created in the above described step S402 (S405).

Then, the data converter 140 executes grouping the recipients (i.e., identifiers of the public key certificates of the recipients) based on kinds of usage authorities assigned to recipients (S406). The usage authorities assigned to respective recipients are hereinafter referred to as "recipient's authorities".

In this embodiment, three kinds of recipient's authorities (printing, changing and copying) are provided. That is, permission or prohibition is set for each of printing, changing and copying. Therefore, the data converter 140 groups the recipients into 9 groups. The data converter 140 executes processing in steps S407 through S415 (described below) for each of the groups which were grouped in the above described step S406.

The data converter 140 creates encryption keys K2 for respective recipients based on current date, current time and the recipient's authorities (S407). The encryption keys K2 are encryption keys of a common key encryption system, and are also used in decryption. The data converter 140 creates the encryption key K2 for each of the groups (which were grouped in step S406). An algorithm for creating the encryption keys K2 is not limited, and various algorithms may be used. In this regard, the encryption key K2 is also referred to as a second encryption key".

Next, the data converter 140 selects one of the above described groups (i.e., one of the recipient's authorities), and synthesizes the PDF encryption key K1 and recipient's authority information I of the selected recipient's authority to obtain continuous data (i.e., a series of binary data). Further, the data converter 140 encrypts the synthesized data using the encryption key K2 (created for each recipient's authority in the above described step S407) to obtain key-storage data D1 (S408).

Then, the data converter 140 executes processing in steps S410 through S412 described below. First, the data converter 140 converts the encrypted data (created in the above described step S408 for each recipient's authority) into PKCS#7 format (Public Key Cryptography Standards No. 7) using the encryption processor 141. The resulting data (converted into PKCS#7 format) is hereinafter referred to as "PKCS#7 data D20". The PKCS#7 data D20 is also referred to as "supplementary data D20". The data converter 140 adds the PKCS#7 data D20 to the PDF file.

In this regard, PKCS is a standard for standardizing the public key encryption technology. PKCS#7 defines a format with which encrypted data or signed data is stored together with public key certificate. Details of PKCS#7 are described in "IETF RFC2315" and the like. Details of specifications for attaching PKCS#7 data to an encrypted PDF file are described in "PDF reference" (3.5.3 Public-Key Security Handlers) published by Adobe System Incorporated.

The data converter 140 creates the PKCS#7 data D20 for respective recipient's authorities (i.e., for respective encrypted data formed in the above described step S408). Therefore, in this embodiment, at most 9 PKCS#7 data D20 are registered for one PDF file.

An example of the PKCS#7 data D20 will be described with reference to FIG. 12A. FIG. 12A is an illustrative view showing an example of a data structure of the PKCS#7 data D20.

The PKCS#7 data D20 shown in FIG. 12A includes the key-storage data D1 created in the above described step S408 for each recipient' authority. The key-storage data D1 is obtained by, for example, synthesizing the PDF encryption key K1 of 20 bytes and the recipient's authority information I of 4 bytes and encrypting the synthesized data using the encryption key K2 corresponding to the recipient's authority. The PKCS#7 data D20 created by the data converter 140 further includes user-supplementary data D2 (D2-1 through D2-N) for N recipients belonging to the same group of the recipient's authority. The user-supplementary data D2 (D2-1 through D2-N) respectively include data D21 (D21-1 through D21-N) and data D22 (D22-1 through D22-N). The data D21 (D21-1 through D21-N) indicate identifiers of the public key certificates of the recipients. The data D22 (D22-1 through D22-N) are obtained by encrypting the encryption key K2 corresponding to the recipient's authority using the public keys K3 (K3-1 through K3-N) of the recipients. When the recipient decrypts the encrypted PDF file, the recipient uses the data D21 (indicating the identifier of the public key certificate of the recipient) to find the data D22 encrypted by its own public key K3.

Then, referring back to FIG. 11, the data converter 140 executes processing in steps S410 through S412 (described below) to create user-supplementary data D2-1 through D2-N (to be added to the PKCS#7 data D20 of the selected recipient's authority) for respective N recipients.

First, the data converter 140 selects one of the recipients belonging to the group of the relevant recipient's authority, and encrypts the encryption key K2 corresponding to the recipient's authority using the public key K3 of the selected recipient to obtain the data D22 (S410).

Then, the data converter 140 creates the user-supplementary data D2 by associating the data D22 of the selected recipient and the data D21 indicating the identifier of the public key certificate of the selected recipient. The data converter 140 adds the user-supplementary data D2 to the PKCS#7 data D20 of the recipient's authority (S411).

Next, the data converter 140 checks whether creation of the user-supplementary data for all of the recipients belonging to the recipient's authority is completed or not (S412). If the creation of the user-supplementary data for all of the recipients belonging to the recipient's authority is not completed, the data converter 140 returns to the above described step S410 (i.e., starts processing for the next recipient).

If the creation of the user-supplementary data for all of the recipients belonging to the recipient's authority is completed, the data converter 140 creates data D32 by encrypting the encryption key K2 for the recipient's authority using a device public key K5 of the MFP 600 (step S413). The device public key k5 is also referred to as a "device key".

Then, the data converter 140 creates device-supplementary data D3 by associating the created data D32 and data D31 indicating an identifier of the public key certificate of the device public key K5. Further, the data converter 140 adds the device-supplementary data D3 to the PKCS#7 data D20 of the recipient's authority (S414).

Next, the data converter 140 executes processing to add the created PKCS#7 data D20 of the recipient's authority to the encrypted PDF file (S415).

Further, the data converter 140 checks whether creation of the PKCS#7 data D20 for all recipient's authorities is completed (S416). If there is any recipient's authority for which creation of the PKCS#7 data D20 is not completed, the data converter 140 returns to the above described step S407 (i.e., starts processing for the next recipient's authority). If the creation of the PKCS#7 data D20 for all recipient's authorities is completed, the data converter 140 supplies the completed encrypted PDF file to the control unit 150 (S417), and ends the data encryption processing.

FIG. 12B is an illustrative view showing an example of a data structure of the completed encrypted PDF file. The encrypted PDF file (i.e., referred to data D100) created by the data converter 140 includes encrypted image data (i.e., encrypted PDF data) D10 and supplementary data D20 including M PKCS#7 data D20-1 through D20-M. In this regard, "M" is the number of the groups (i.e., the recipient's authorities).

Figure 13:
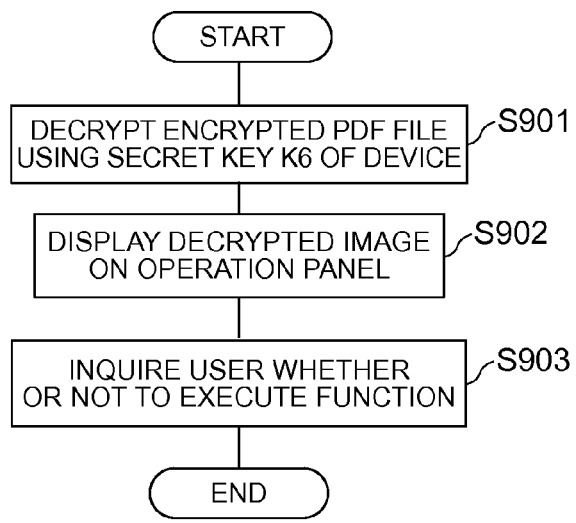
FIG. 13 is a flowchart showing encrypted data display/confirmation processing according to the first embodiment.

Next, the encrypted data display-and-confirmation processing executed by the control unit 150 in the above described step S900 (FIG. 3) will be described with reference to FIG. 13. FIG. 13 is a flowchart showing the encrypted data display-and-confirmation processing of the first embodiment.

First, the control unit 150 supplies the completed encrypted PDF file and a device secret key K6 corresponding to the device public key K5 of the MFP 600 to the data decryption unit 142, and causes the data decryption unit 142 to decrypt the encrypted PDF file using the device secret key K6 (S901).

In this regard, the encrypted PDF file includes the device-supplementary data D3 (including the data D32 obtained by encrypting the encryption key K2 using the device public key K5) which was added in the above described step S414 (FIG. 11). Therefore, the control unit 150 can decrypt the encrypted PDF file using the device secret key K6.

Figure 14:
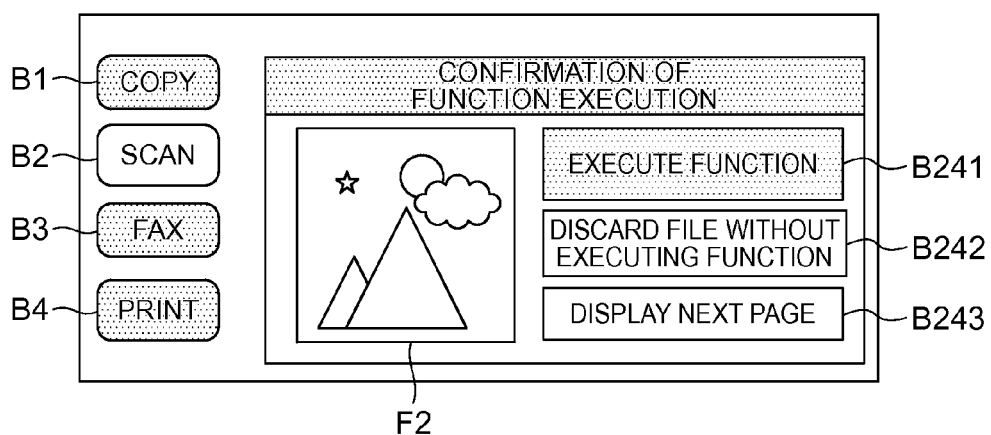
FIG. 14 is an illustrative view showing an example of a function execution confirmation screen according to the first embodiment.

Then, the control unit 150 cause's the operation panel 160 to display a function execution confirmation screen including an image of the PDF file obtained by decrypting the encrypted PDF file and buttons for selecting whether or not to execute functions as shown in FIG. 14 (S902). Using the function execution confirmation screen, the control unit 150 receives a user's confirmation on whether or not to execute each function (S903).

FIG. 14 shows an example of the function execution confirmation screen of the first embodiment. The function execution confirmation screen includes a field F2 for displaying the image of the encrypted PDF file, a button B241 for confirming execution of the function (selected among the buttons B1 through B4), a button B242 for discarding the PDF file without executing the function, and a button B243 for displaying the next page of the PDF file in the field F2. When the user selects (touches) the button B241, the control unit 150 obtains the user's confirmation to execute the function, and proceeds to step S500 to start selected function executing processing described below.

Figure 15:
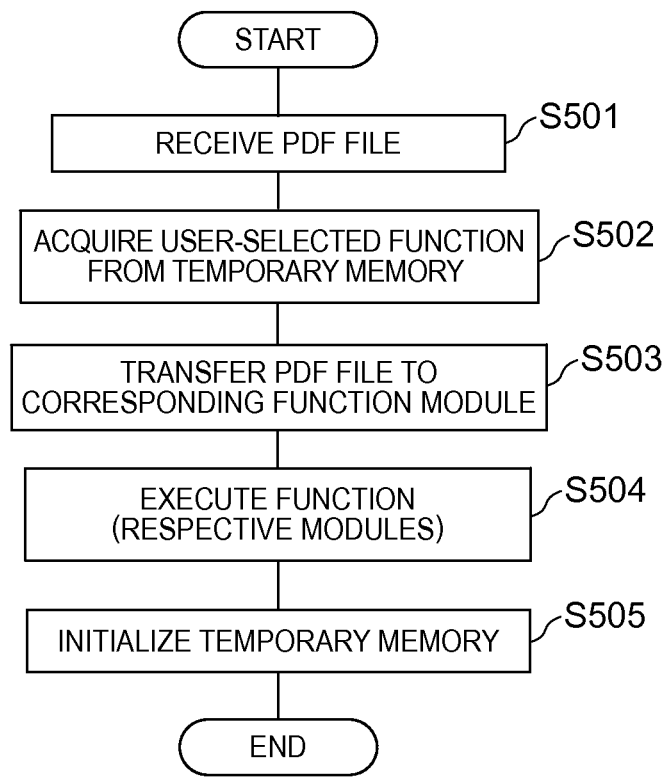
FIG. 15 is a flowchart showing selected function executing processing of the first embodiment.

Next, the selected function executing processing executed by the control unit 150 in the above described step S500 (FIG. 3) will be described with reference to FIG. 15. FIG. 15 is a flowchart showing the selected function executing processing of the first embodiment.

When the control unit 150 proceeds to step S500 and starts the selected function executing processing, the control unit 150 obtains the encrypted PDF file (S501), and obtains the user-selected function information from the temporary memory 240 (S502). Further, the control unit 150 transfers the encrypted PDF file to one of the function modules (i.e., the FAX execution unit 91, the USB port 92, the network interface 93 and the email creation unit 94) of the accessory function execution unit 90 corresponding to the user-selected function information (S503).

For example, when the function "Scan to USB" is selected as the user-selected function information, the control unit 150 transfers the data of the encrypted PDF file to the USB port 92.

The respective modules of the accessory function execution unit 90 that receive the encrypted PDF file execute the functions of the respective modules (S504). For example, when the function "Scan to USB" is selected as the user-selected function information, the control unit 150 stores the encrypted PDF file in a predetermined directory (for example, a root directory) of the USB memory (i.e., the external storage unit) U via the USP port 92.

Then, the control unit 150 initializes the temporary memory 240 (S505), and ends the selected function executing processing.

Advantages of First Embodiment

The first embodiment of the present invention provides the following advantages.

When the MFP 600 of the first embodiment creates the encrypted PDF file, the MFP 600 adds the supplementary data 20 including the key-storage data D1 and the device-supplementary data D3 to the encrypted PDF file. The encrypted PDF file can be decrypted using the PDF encryption key K1.

The encrypted PDF file created by the MFP 600 of the first embodiment is encrypted according to specifications (PKCS#7 or the like) used in general PDF format. The recipient who receives the encrypted PDF file can execute processing using a conventional PDF viewer or an editing tool within a given authority. Therefore, the encrypted PDF file which is not decryptable without using the secret key corresponding to the public key can be created without registering the secret key (of a creator of the encrypted PDF file) to the MFP 600. Accordingly, the MFP 600 of the first embodiment can create the encrypted PDF file more safely.

Second Embodiment

An image data processing device and an image data processing program of the second embodiment of the present invention will be described. In the second embodiment, the MFP will be described as an example of the image data processing device.

Configuration of Second Embodiment

The image data processing device (i.e., the MFP) of the second embodiment has a functional configuration described in the first embodiment with reference to FIGS. 1 and 2.

The description of the second embodiment will be mainly focused on differences from the first embodiment. The second embodiment is different from the first embodiment in that, when the MFP 600 of the second embodiment acquires the encrypted PDF file (having a structure shown in FIGS. 12A and 12B) created by itself from the USB memory U, the MFP 600 can execute processing of the encrypted PDF file according to the authority assigned to a user who is operating the MFP 600. Details of processing executed by the MFP 600 of the second embodiment will be described in a description of an operation.

Operation of Second Embodiment

An operation of the MFP 600 of the second embodiment will be described. An entire operation of the MFP 600 will be described with reference to FIG. 16, and thereafter respective steps of the flowchart will be described.

Figure 16:
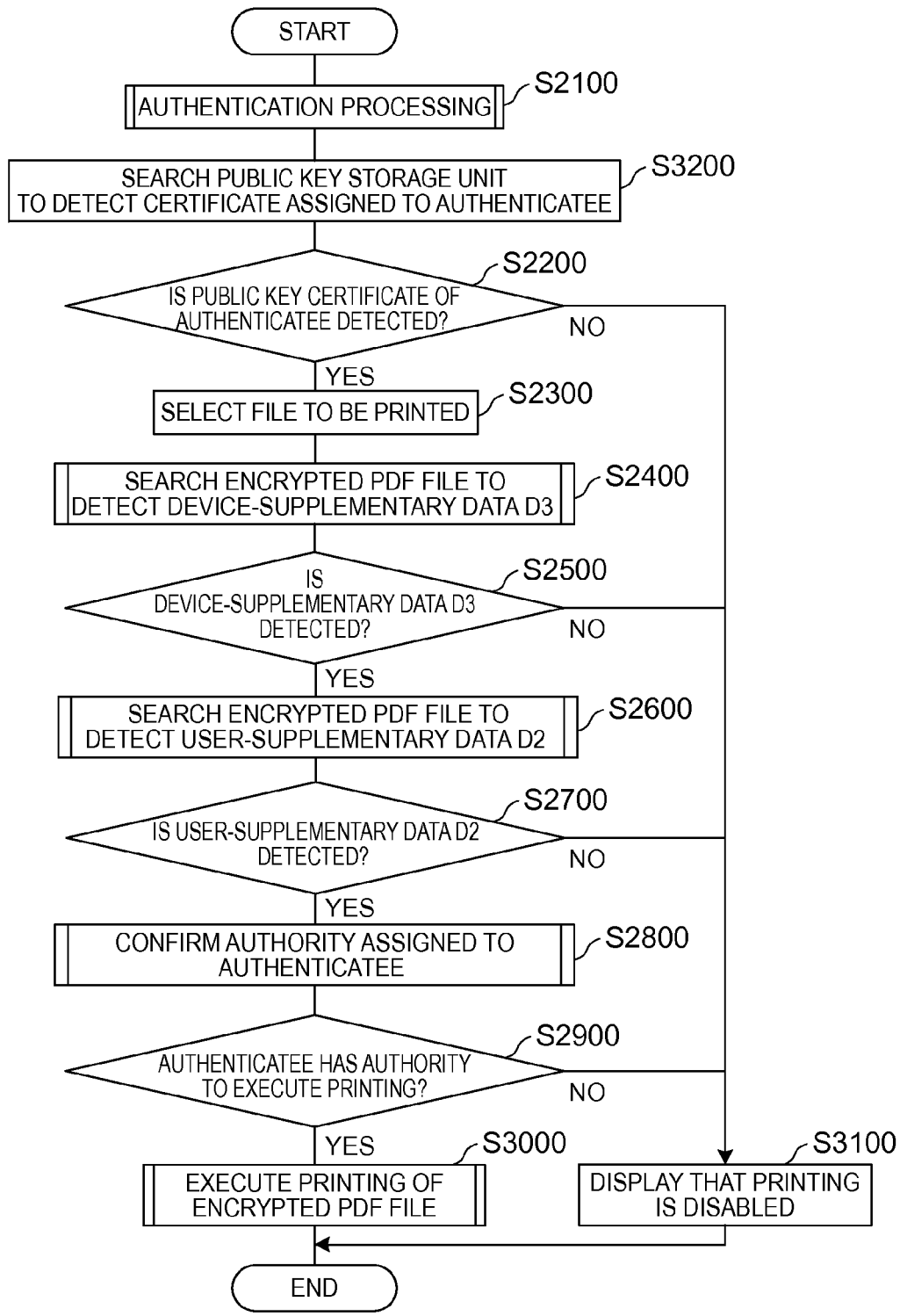
FIG. 16 is a flowchart showing an entire operation of an MFP according to the second embodiment.

FIG. 16 is a flowchart showing the entire operation of the MFP 600 of the second embodiment. First, the authentication processor 260 of the control unit 150 executes an authentication processing (S2100) according to the user's operation on the operation panel 160. The authentication processing (S2100) is executed as described in the first embodiment with reference to FIG. 4. It is herein assumed that the authentication processor 260 receives the user ID and the password, and the authentication is successful (steps S101 through S104 in FIG. 4). Further, it is herein assumed that the user selects "Print" function in the function selection screen (step S105 in FIG. 4).

Then, the control unit 150 searches the public key storage unit 230 to find (detect) a public key certificate assigned to a logging-in user (referred to as an "authenticatee") (S3200). The control unit 150 checks whether the public key certificate of the authenticatee is detected in the public key-storage portion 230 (S2200). If the public key certificate of the authenticatee is detected, the control unit 150 proceeds to step S2300 described below. If the public key certificate of the authenticatee is not detected, the control unit 150 causes the operation panel 160 to display the message indicating that printing is disabled (S3100), and ends the processing.

If the public key certificate of the authenticatee is detected in the above described step S2200, the control unit 150 executes processing to select a file to be printed (S2300). In this process, it is possible to cause the operation panel 160 to display file names of the encrypted PDF files stored in the USB memory U connected to the USB port 92 (for example, in the form of a list as shown in FIG. 8) so that the user can select any of the encrypted PDF files. When the user selects any of the encrypted PDF files, the control unit 150 obtains the data of the encrypted PDF file, and stores the data in the temporary memory 240.

Then, the control unit 150 searches the data attached to the encrypted PDF file stored in the temporary memory 240 to detect the device-supplementary data D3 corresponding to the MFP 600 (S2400).

Figure 17:
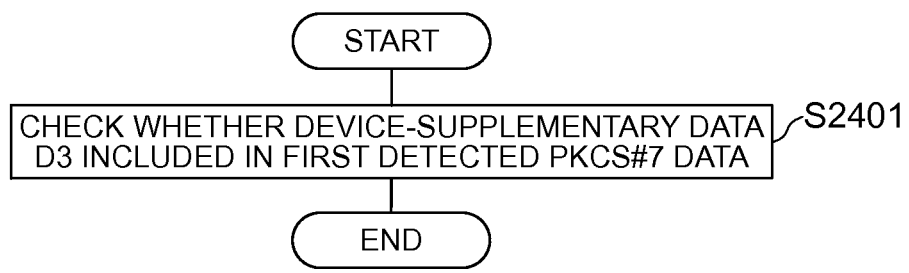
FIG. 17 is a flowchart showing search processing for device-supplementary data according to the second embodiment.

The search processing for the device-supplementary data D3 in the above described step S2400 will be described with reference to FIG. 17. FIG. 17 is a flowchart showing the search processing for the device-supplementary data D3 of the second embodiment. The control unit 150 searches the data attached to the encrypted PDF file stored in the temporary memory 240, and checks whether the device-supplementary data D3 corresponding to the MFP 600 is included in the first detected PKCS#7 data D20 (S2401). If the device-supplementary data D3 corresponding to the MFP 600 is detected, the control unit 150 proceeds to step S2500 (FIG. 16). If the device-supplementary data D3 corresponding to the MFP 600 is not detected, the control unit 150 proceeds to the above described step S3100 (i.e., displaying the message indicating that printing is disabled), and ends the processing.

In this regard, there are cases where a plurality of PKCS#7 data D20 are included in the data attached to the encrypted PDF file. In this example, the control unit 150 searches the first detected PKCS#7 data D20 to detect the device-supplementary data D3 corresponding to the MFP 600. Since all of the PKCS#7 data D20 include the device-supplementary data D3 as described in the first embodiment, it is only necessary to search only one PKCS#7 data D20.

Referring back to FIG. 16, when the device-supplementary data D3 corresponding to the MFP 600 is detected, the control unit 150 searches the encrypted PDF file to detect the user-supplementary data D2 corresponding to the authenticatee (S2600). If the user-supplementary data D2 for the authenticatee is detected, the control unit 150 proceeds to step S2800 described below. If the user-supplementary data D2 for the authenticatee is not detected, the control unit 150 proceeds to the above described step S3100 (i.e., displaying the message indicating that printing is disabled), and ends the processing.

The search processing for the user-supplementary data D2 in the step S2600 will be described with reference to FIG. 18.

Figure 18:
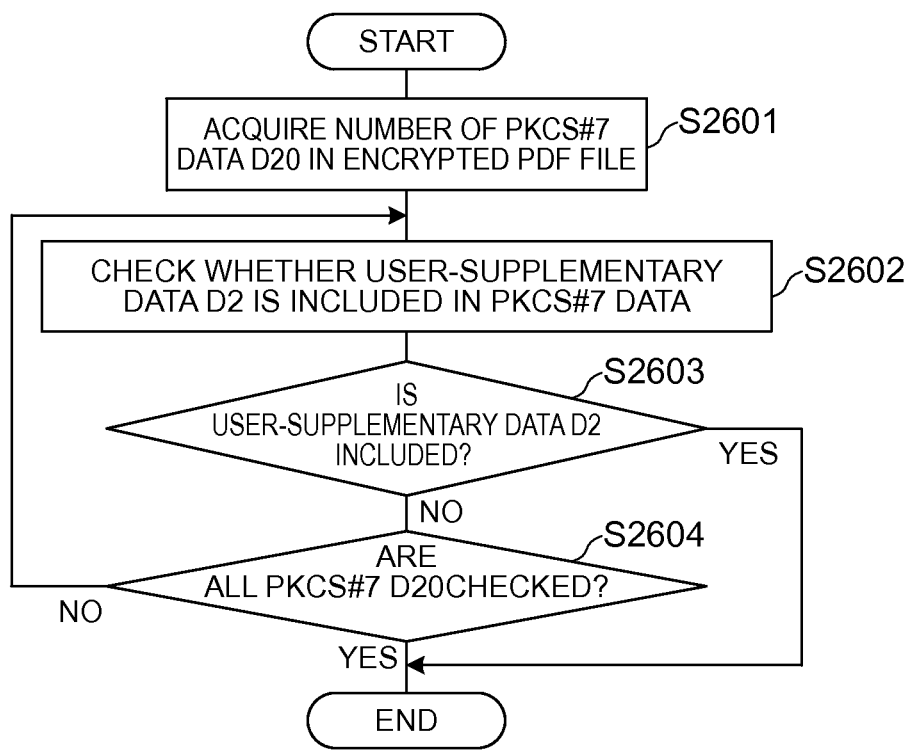
FIG. 18 is a flowchart showing search processing for user-supplementary data of the second embodiment.

FIG. 18 is a flowchart showing the search processing for the user-supplementary data D2 of the second embodiment. First, the control unit 150 checks the number of PKCS#7 data D20 included in the supplementary data of the encrypted PDF file (S2601). Then, the control unit 150 executes processing in steps S2602 through S2604 (i.e., searching for the user-supplementary data D2 of the authenticatee) for all of the PKCS#7 data D20.

That is, the control unit 150 searches the PKCS#7 data D20 to check whether the user-supplementary data D2 for the authenticatee (i.e., the data D21 indicating the identifier of the public key certificate of the authenticatee) is included in the PKCS#7 data D20 (S2602 and S2603). If the user-supplementary data D2 for the authenticatee is included in the PKCS#7 data D20, the control unit 150 ends the search processing. If the user-supplementary data D2 for the authenticatee is not included in the PKCS#7 data D20, the control unit 150 checks whether all of the PKCS#7 data D 20 are searched (step S2604). If there is unsearched PKCS#7 data D20, the control unit 150 returns to the above described step S2602 to search the next PKCS#7 data D20. If there is no unsearched PKCS#7 data D20, the control unit 150 ends the search processing.

Referring back to FIG. 16, when the control unit 150 obtains the user-supplementary data D2 for the authenticatee, the control unit 150 executes processing to confirm the authority assigned to the authenticatee regarding the encrypted PDF file (S2800).

The authority confirmation processing in the above described step S2800 will be described with reference to FIG. 19.

Figure 19:
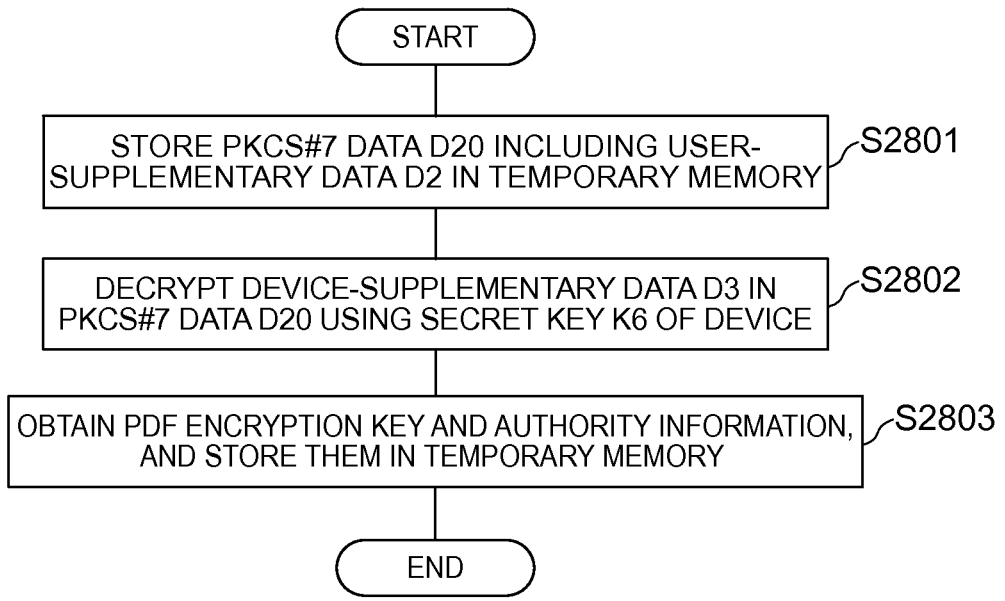
FIG. 19 is a flowchart showing authority confirmation processing according to the second embodiment.

FIG. 19 is a flowchart showing the authority confirmation processing according to the second embodiment. First, the control unit 150 stores the PKCS#7 data D20 including the user-supplementary data D2 for the authenticatee in the temporary memory 240 (S2801).

Next, the control unit 150 causes the data decryption unit 142 to decrypt the device-supplementary data D3 (i.e., the encrypted data D32) of the PKCS#7 data D20 using the device-secret key K6 of the MPF 600 (S2802), and obtains the encryption key K2 (20 Bytes). Further, the control unit 150 causes the data decryption unit 142 to decrypt the key-storage data D1 of the PKCS#7 data D20 using the encryption key K2, and obtains the PDF encryption key K1 and the recipient's authority information I (4 Bytes) for the recipient's authority (S2803). The recipient's authority information I (4 Bytes) includes information on authority (i.e., information on permission and prohibition of each of printing, changing and copying) according to specifications of PDF.

Then, referring back to FIG. 16, the control unit 150 refers the obtained recipient's authority information I, and checks whether the authenticatee has the authority to execute printing (S2900). If it is confirmed that the authenticatee has the authority to execute printing (i.e., if the recipient's authority information I includes permission of printing), the control unit 150 proceeds to step S3000 described below. If the authenticatee has no authority to execute printing, the control unit 150 proceeds to the above described step S3100 (displaying the message indicating that printing is disabled), and ends the processing.

If the control unit 150 confirms that the authenticatee has the authority to execute printing in the above described step S2900, the control unit 150 executes printing of the PDF file (S3000), and ends the processing.

Figure 20:
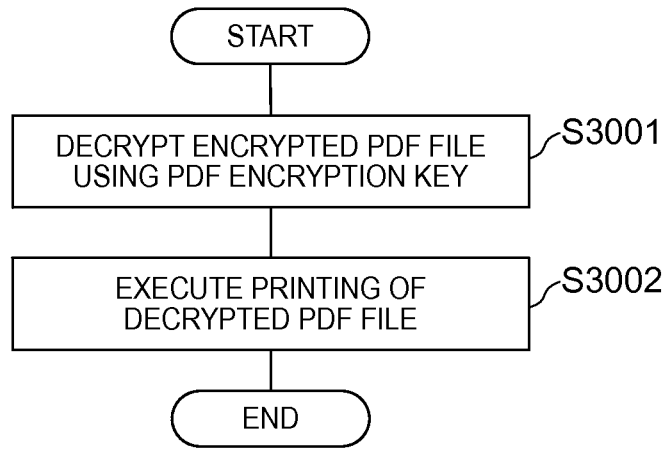
FIG. 20 is a flowchart showing printing processing of the second embodiment.

The printing processing (S3000) will be described with reference to FIG. 20. FIG. 20 is a flowchart showing the printing processing of the second embodiment.

The control unit 150 causes the data decryption unit 142 to decrypt the encrypted PDF file using the PDF encryption key K1 obtained in the above described step S2800 (S3001). Then, the control unit 150 causes the printing unit 95 to print an image of the decrypted PDF file (S3002).

Advantages of Second Embodiment

The second embodiment provides the following advantages in addition to the advantages of the first embodiment.

The MFP 600 of the second embodiment checks the authority assigned to the authenticatee based on the supplementary data (i.e., the data D21 indicating the identifier of the public key certificate of the authenticatee) of the respective PKCS#7 data D20, and executes processing such as printing within the authority assigned to the authenticatee. Therefore, it becomes possible to confirm the authority assigned to the authenticatee based on the secret key of the MFP 600 (without registering the user's secret key to the MFP 600) and to execute processing such as printing within the authority assigned to the authenticatee. Accordingly, the MFP 600 can execute processing of the encrypted PDF file more safely.

MODIFICATIONS

The present invention is not limited to the above described embodiments, but following modifications can be made.

For example, in the above described embodiments, the MFP has been described as an example of the image data processing device. However, the image data processing device of the present invention is also applicable to, for example, a device (for example, a scanner) having no printing unit (i.e., no image forming unit) and configured to execute other processing than printing.

Further, the image data processing device of the present invention is applicable to a device that has no image reader, and that creates an encrypted PDF file based on image data supplied from outside. For example, the image data processing device can be implemented by installing an image data processing program in a computer (for example, a personal computer) connected to a scanner.

Moreover, the present invention is applicable to an image data processing program that causes a computer to function as the components of the MFP 600 described in the first and second embodiment.

In the above described embodiments, the device-supplementary data D3 included in the respective PKCS#7 data D20 is only the device-supplementary data D3 of the MFP 600 that creates the encrypted PDF file as shown in FIG. 12A. However, it is also possible to create a device-supplementary data D3 using the public key of another image data processing device (such as an MFP), and to add such a device-supplementary data D3 to the PKCS#7 data D20. In other words, the number of the device-supplementary data D3 included in the PKCS#7 data D20 is not limited. For example, if 10 MFPs are used in a company, it is possible to add ten device-supplementary data D3 (respectively using public keys of all of the 10 MFPs) to the PKCS#7 data D20 when creating an encrypted PDF. With such an arrangement, the recipient of the encrypted PDF file can execute processing such as printing using any of the ten MFPs in the company.

In the above described embodiments, the encrypted image data created by the MFP is in the PDF format. However, as long as the encrypted image data has the data structure as described with reference to FIGS. 12A and 12B, other specifications are not limited to PDF and PKCS#7.

In the above described embodiments, the device-supplementary data D3 is included in all of the PKCS#7 data constituting the supplementary data. However, it is also possible that the device-supplementary data D3 is included in at least one of the PKCS#7 data constituting the supplementary data D20. For example, it is also possible that the device-supplementary data D3 is included only in the first PKCS#7 data of the supplementary data D20. Further, it is also possible that the device-supplementary data D3 is included only in the PKCS#7 data corresponding to the recipient's authority having all of the authorities.

In the above described embodiments, the MFP creates encrypted PDF files and executes output processing (i.e., printing). However, the MFP can also be configured to only execute output processing. Further, the MFP can also be configured to only execute processing as shown in FIGS. 16 through 20. FIG. 21 shows an example of such an MFP (referred to as an MFP 600A). The MFP 600A shown in FIG. 21 has no data converter 140 shown in FIG. 2. The MFP 600A receives the encrypted PDF data outputted by the MFP 600 (FIG. 2), and executes processing (for example, printing) as shown in FIGS. 16 through 20.

While the preferred embodiments of the present invention have been illustrated in detail, it should be apparent that modifications and improvements may be made to the invention without departing from the spirit and scope of the invention as described in the following claims.

What is claimed is:

1. An image data processing device, comprising:
an image data storage unit that stores image data; and
a data converter including a hardware processor, which executes program instructions to thereby cause the data converter to provide functions of:
   a first encryption unit that encrypts the image data stored in the image data storage unit using a first encryption key to create encrypted image data;
   a second encryption key creation unit that creates a second encryption key assigned to each of usage authorities;
   a key-storage data creation unit that creates a key-storage data for each of the usage authorities, by encrypting the first encryption key and authority information indicating said each usage authority using the second encryption key assigned to said each usage authority;
   a device-supplementary data creation unit that creates device-supplementary data for at least one of the usage authorities and for at least one device key of at least one image data processing device, the device-supplementary data including an identifier of the device key and encrypted data created by encrypting the second encryption key assigned to the usage authority using the device key of the image data processing device; and
   a data output unit that outputs the encrypted image data with supplementary data including the key-storage data and the device-supplementary data for each of the usage authorities.

2. The image data processing device according to claim 1, wherein the device-supplementary data creation unit creates the device-supplementary data based on at least the device key of the image data processing device, and
wherein the image data processing device further comprises:
   a data decryption unit including another hardware processor, which executes program instructions to thereby causes the data decryption unit to provide functions of:
      a second encryption key acquiring unit that acquires the device-supplementary data assigned to the image data processing device from the supplementary data attached to the encrypted image data outputted by the data output unit, and acquires the second encryption key by decrypting the acquired device-supplementary data;
      a first encryption key acquiring unit that acquires the first encryption key from the key-storage data using the acquired second encryption key; and
      a decryption unit that decrypts the encrypted image data using the acquired first encryption key to obtain image data, and
   a printer that outputs the image data decrypted by the decryption unit.

3. The image data processing device according to claim 2, wherein the second encryption key acquiring unit decrypts the acquired device-supplementary data using a secret key of the image data processing device.

4. The image data processing device according to claim 2, further comprising:
a user key storage unit that stores at least one user key corresponding to respective usage authorities of the image data, and
wherein the functions include functions of
   a user-supplementary data creation unit that creates user-supplementary data for each of the user keys stored in the user key storage unit, the user-supplementary data including an identifier of the user key and encrypted data created by encrypting the second encryption key assigned to the usage authority corresponding to the user key using the user key.

5. The image data processing device according to claim 4, further comprising:
an encrypted image data storage unit that stores the encrypted image data with the supplementary data outputted by the data output unit; and
a control unit including a third hardware processor, which executes program instructions to thereby causes the control unit to provide functions of:
   an authentication unit that executes authentication of the user in response to an operation by the user;
   a user-supplementary data detection unit that detects the user-supplementary data corresponding to the user key of a user authenticated by the authentication unit from the supplementary data attached to the encrypted image data stored in the encrypted image data storage unit;
   an authority information acquiring unit that acquires authority information by decrypting the key-storage data corresponding to the same usage authority as the user-supplementary data detected by the user-supplementary data detection unit using the second encryption key acquired by the second encryption key acquiring unit, and
   an image output unit that outputs an image based on the image data decrypted by the decryption unit within usage authority based on the authority information.

6. The image data processing device according to claim 5, wherein the image output unit causes the printer to print an image based on the image data decrypted by the decryption unit only when printing is permitted by the authority information acquired by the authority information acquiring unit.

7. The image data processing device according to claim 1, wherein the user key is a public key of the user, and
wherein the device key is a public key of the image data processing device.

8. An image data processing device receiving data from another image data processing device that includes
an image data storage unit that stores image data;
a data converter including a first hardware processor, which execute program instructions to thereby causes the data converter to
   encrypt the image data stored in the image data storage unit using a first encryption key to create encrypted image data,
   create a second encryption key assigned to each of a plurality of usage authorities,
   create key storage data for each of the usage authorities by encrypting the first encryption key and authority information using the second encryption key, create encrypted data by encrypting the second encryption key using a device key of the image data processing device, and create device supplementary data including an identifier of the device key and the encrypted data; and a data output unit that outputs the encrypted image data with supplementary data including the key-storage data and the device-supplementary data, the image data processing device comprising:

a data decryption unit including a second hardware processor, which executes program instructions to thereby causes the data decryption unit to provide functions of:

a second encryption key acquiring unit that acquires the device-supplementary data assigned to the image data processing device from the supplementary data attached to the encrypted image data outputted by the another image data processing device, and acquires the second encryption key by decrypting the acquired device-supplementary data;

a first encryption key acquiring unit that acquires the first encryption key from the key-storage data using the acquired second encryption key; and a decryption unit that decrypts the encrypted image data using the acquired first encryption key to obtain image data, and a printer that outputs the image data decrypted by the decryption unit.

9. A non-transitory computer-readable medium that contains image data processing program instructions embodied therein, the program instructions comprising instructions of a first encryption unit that encrypts image data stored in an image data storage unit using a first encryption key to create encrypted image data;

instructions of a second encryption key creation unit that creates a second encryption key assigned to each of a plurality of usage authorities;

instructions of a key-storage data creation unit that creates a key-storage data for each of the usage authorities, by encrypting the first encryption key and authority information indicating said each usage authority using the second encryption key assigned to said each usage authority;

instructions of a device-supplementary data creation unit that creates device-supplementary data for at least one of the usage authorities and for at least one device key of at least one image data processing device, the device-supplementary data including an identifier of the device key and encrypted data created by encrypting the second encryption key assigned to the usage authority using the device key of the image data processing device; and instructions of a data output unit that outputs the encrypted image data with supplementary data including the key-storage data and the device-supplementary data for each of the usage authorities.

10. The non-transitory computer-readable medium of claim 9, further comprising:

instructions of a second encryption key acquiring unit that acquires the device-supplementary data assigned to the image data processing device from the supplementary data attached to the encrypted image data outputted by the data output unit, and acquires the second encryption key by decrypting the acquired device-supplementary data;

instructions of a first encryption key acquiring unit that acquires the first encryption key from the key-storage data using the acquired second encryption key;

instructions of a decryption unit that decrypts the encrypted image data using the acquired first encryption key to obtain image data, and instructions of an output unit that outputs the image data decrypted by the decryption unit.

* * * * *